United States Patent
Miyata

(10) Patent No.: US 7,851,533 B2
(45) Date of Patent: Dec. 14, 2010

(54) STABILIZED HALOGEN-CONTAINING RESIN COMPOSITION

(75) Inventor: Shigeo Miyata, Kitakyushuu (JP)

(73) Assignee: Kabushiki Kaisha Kaisui Kagaku Kenkyujo, Fukuoka (JP)

( * ) Notice: Subject to any disclaimer, the term of this patent is extended or adjusted under 35 U.S.C. 154(b) by 11 days.

(21) Appl. No.: 12/379,386

(22) Filed: Feb. 20, 2009

(65) Prior Publication Data

US 2010/0216927 A1    Aug. 26, 2010

(51) Int. Cl.
*C08K 3/10*    (2006.01)
*C08K 3/22*    (2006.01)

(52) U.S. Cl. ........................ 524/413; 524/436

(58) Field of Classification Search .......... 524/413
See application file for complete search history.

(56) References Cited

U.S. PATENT DOCUMENTS 5,133,899 A * 7/1992 Nakazawa et al. ....... 252/400.3

7,041,265 B2 * 5/2006 Ishida et al. ................ 423/331

OTHER PUBLICATIONS

STIC search results, Jul. 31, 2009.*

* cited by examiner

*Primary Examiner*—Ling-Siu Choi
*Assistant Examiner*—Hui Chin
(74) *Attorney, Agent, or Firm*—Wenderoth, Lind & Ponack, L.L.P.

(57) ABSTRACT

A stabilized halogen-containing resin composition containing a halogen-containing resin and a complex of acid white clay and/or activated white clay with a calcium hydroxide compound represented by the formula (1), $$Ca_{1-x-y}M^{2+}_xAl_y(OH)_2 \qquad (1)$$

wherein $M^{2+}$ represents at least one bivalent metal selected from the group consisting of Mg, Zn, Cu and etc., x is in the range of $0 \leq x < 0.4$ and y is in the range of $0 \leq y < 0.1$, which composition solves the problems of strong initial coloration and poor processing stability of a calcium hydroxide compound, a process for producing the above complex and a thermal stabilizer containing the above complex.

7 Claims, No Drawings

STABILIZED HALOGEN-CONTAINING RESIN COMPOSITION

TECHNICAL FIELD

The present invention relates to a stabilized halogen-containing resin composition containing a complex of a calcium hydroxide compound with acid white clay and/or activated white clay. More specifically, it relates to a nontoxic halogen-containing resin composition containing a calcium hydroxide stabilizer which composition is improved in thermal stability and initial colorability.

BACKGROUND ARTS OF THE INVENTION

A halogen-containing resin is unstable with regard to heat or light. Therefore, it is necessary to incorporate a thermal stabilizer before heating and melt-molding. A lead compound, an organotin compound, a Cd/Ba-containing complex metal soap, a Ba/Zn-containing complex metal soap, a Ca/Zn-containing complex metal soap and a hydrotalcite have been used as the thermal stabilizer. However, the use of a Cd or Pb-containing stabilizer, which is toxic, has been gradually prohibited. In particular, since the lead compound is economical and exhibit high performance, it is used in large quantities. Accordingly, it is important to develop a substitute stabilizer.

A hydrotalcite is nontoxic and also excellent in thermal stability. However, it has crystal water so that a defect is that foaming occurs when the amount of the hydrotalcite to be incorporated is large. On the other hand, calcium hydroxide has no crystal water so that it is free from foaming and also excellent in thermal stability. However, when the amount of the calcium hydroxide to be incorporated is increased, torque increases during processing of a resin in some cases. Further, another defect thereof is that it gives strong coloration.

SUMMARY OF THE INVENTION

It is an object of the present invention to provide a calcium hydroxide thermal stabilizer which is nontoxic, free from foaming and almost free from a torque increase at a processing time and coloration at an initial period and a middle period and a stabilized halogen-containing resin composition containing the above thermal stabilizer.

The present invention provides a stabilized halogen-containing resin composition containing a complex of a calcium hydroxide compound and at least one selected from the group consisting of acid white clay and activated white clay.

Further, the present invention provides a process for the production of the above complex and a thermal stabilizer comprising the above complex as an active ingredient.

EFFECT OF THE INVENTION

According to the present invention, a torque increase during processing is repressed and coloration is also reduced. Further, a thermal stabilizing effect is improved.

DETAILED DESCRIPTION OF THE INVENTION

The present inventor has thought the cause of the above-mentioned defects of a calcium hydroxide compound is its strong alkalinity, in other words, electron donating property and further thought that a safe solid acid material (electron-withdrawing property) is effective for repressing the above strong alkalinity. Accordingly, the present inventor has completed the present invention.

The calcium hydroxide compound used in the complex of the present invention is a calcium hydroxide or a calcium hydroxide solid solution represented by the formula (1) or the formula (2),

$$Ca_{1-x-y}M^{2+}_{x}Al_{y}(OH)_2 \quad (1)$$

wherein $M^{2+}$ represents at least one bivalent metal selected from the group consisting of Mg, Zn, Cu and etc., x is in the range of $0 \leq x < 0.4$ and y is in the range of $0 \leq y < 0.1$,

$$Ca_{1-x}M^{2+}_{x}(OH)_2 \quad (2)$$

wherein $M^{2+}$ is at least one bivalent metal selected from the group consisting of Mg, Zn and Cu, and x is in the range of $0 \leq x < 0.2$.

The calcium hydroxide compound used in the present invention has the same crystal structure as that of calcium hydroxide. Al contributes an improvement in terms of initial coloration. However, a water content increases as Al increases. Therefore, the calcium hydroxide compound is preferably a compound of the formula (2) which does not contain Al. The calcium hydroxide compound is complexed with acid white clay and/or activated white clay.

The acid white clay is produced by refining a montmorillonite clay. The typical chemical structure thereof is represented by $Al_2O_3 \cdot 4SiO_2 \cdot nH_2O$. The acid white clay has a structure in which a dioctahedral alumina layer is sandwiched between two silica layers. Part of Al of the alumina layer is substituted with Mg or $Fe^{2+}$ and part of Si of the silica layers is substituted with Al or $Fe^{3+}$ so that it is negatively charged. Hence, Ca, Mg, H, etc. are present as cation exchange positive ions on the surfaces of the silica layers for keeping electrical neutrality. As the number of H increases, acidity becomes stronger. Its pH is in the range of about 5 to 7.

The activated white clay is obtained by treating acid white clay with a mineral acid (mainly sulfuric acid) and eluting part of Al, Fe and Mg. The characteristic feature thereof is a high specific surface area (about 200 to 400 $m^2/g$) and a stronger acidity (pH=about 3 to 4).

It is preferred that the complex of the calcium hydroxide compound with the acid white clay and/or the activated white clay, preferably with the activated white clay, provided by the present invention, is prepared by complexing the calcium hydroxide compound with the acid white clay and/or the activated white clay in an amount of 0.1 to 50 parts by weight, preferably 1 to 10 parts by weight, based on 100 parts by weight of the calcium hydroxide compound, by the following method.

The complexing can be carried out by a method in which the acid white clay and/or the activated white clay and the calcium hydroxide compound are mixed in an aqueous medium with stirring, and the mixture is heated at preferably 60° C. or higher. Preferably, the acid white clay and/or the activated white clay are dispersed in water, calcium oxide or a solid solution ((Ca, Mg, Zn)O) of Mg, Zn or the like in calcium oxide is added with stirring, and the mixture is heated at preferably 60° C. or higher, particularly preferably at 70-100° C. The time of mixing both and the time of stirring and mixing both under heat are not specially limited and are preferably about 10 to 60 minutes. The acid white clay and/or the activated white clay are added before and/or after the addition of the calcium compound. The complex after the wet mixing is then subjected to common procedures such as surface treatment, filtering, drying and pulverization, as required.

In order to improve the dispersibility of the complex in a halogen-containing resin, it is preferred to surface-treat the complex with an anion surfactant. The surface treatment can be carried out by a method in which an anion surfactant such as a higher fatty acid typified by a lauric acid or stearic acid, an alkali metal salt of a higher fatty acid typified by sodium laurate or sodium stearate, or a phosphoric acid ester typified by stearyl acid phosphate, is prepared in an amount of 0.1 to 10% by weight based on the weight of the complex, the anion surfactant is dissolved or emulsified in hot water, and the resultant mixture is added and mixed to/with a slurry of the complex with stirring. In addition to the above wet process, it is possible to carry out the surface treatment by a so-called dry process in which a powder of the complex obtained by pulverization after drying is added to a solution or emulsion of the anion surfactant in an alcohol or the like while stirring with a Henschel mixer or the like. The wet process is preferred.

The stabilized halogen-containing resin composition of the present invention contains 100 parts by weight of a halogen-containing resin and 0.01 to 10 parts by weight, preferably 0.05 to 5 parts by weight, particularly preferably 0.1 to 2 parts by weight, of the complex of the present invention.

In the present invention, it is preferred to incorporate at least one member selected from the group consisting of a zinc compound (a) in an amount of 0.01 to 2 parts by weight, preferably 0.1 to 1 part by weight, a β-diketone (b) in an amount of 0.001 to 2 parts by weight, preferably 0.01 to 1 part by weight, a polyhydric alcohol (c) in an amount of 0.0001 to 5 parts by weight, preferably 0.1 to 2 parts by weight, and an organotin compound (d) in an amount of 0.001 to 5 parts by weight, based on 100 parts by weight of the halogen-containing resin, in addition to the complex of the present invention.

Examples of the zinc compound (a) used in the present invention include zinc salts of organic acids such as lauric acid, palmitic acid and stearic acid, zinc oxide and zinc carbonate. The zinc compound (a) is preferably an organic acid salt of zinc.

The β-diketone (b) used in the present invention is a compound effective for the prevention of initial coloration, which is represented by the formula (3),

$$R_1\text{—CO—CHR}_2\text{—COR}_3 \quad (3)$$

wherein $R_1$ and $R_3$ are the same or different and represent a linear or branched alkyl or alkenyl group having 30 or less carbon atoms, an aryl group or an alicyclic group, and $R_2$ represents hydrogen, an alkyl group or an alkenyl group.

Preferred examples of the β-diketone (b) include dibenzoylmethane (DBM), stearoylbenzoylmethane (SBM), benzoylacetone, acetylacetone and dehydroacetic acid. The polyhydric alcohol (c) used in the present invention is effective for improvement in thermal stability. The polyhydric alcohol (c) is a polyhydric alcohol or a partial ester of a polyhydric alcohol and mono- or poly-carboxylic acid. Examples thereof include mannitol, sorbitol, pentaerythritol, dipentaerythritol and trimethylolpropane.

Examples of the organotin compound (d) used in the present invention include organotin stabilizers such as a methyltin compound, a butyltin compound and an octyltin compound. Examples of the methyltin compound include dimethyltin laurate, dimethyltin maleate and dimethyltin mercaptide. Examples of the butyltin compound include dibutyltin laurate, dibutyltin maleate and dibutyltin mercaptide. Examples of the octyltin compound include dioctyltin laurate, dioctyltin maleate and dioctyltin mercaptide.

The complex used in the present invention is thought as follows. That is, the calcium hydroxide compound which has strong alkalinity (in other words, solid base) interacts with a solid acid of the acid white clay and/or the activated white clay and the solid acid, which has an electron-accepting property, captures a donor electron of the calcium hydroxide compound. Accordingly, coloration of vinyl chloride is reduced and, at the same time, chemical neutralization occurs, which prevents the decomposition of vinyl chloride and other additive. The complex shows an X-ray diffraction pattern of calcium hydroxide, and a crystal material other than calcium hydroxide is not detected. Therefore, it is thought that the solid acid and the solid base interact with each other to neutralize the functions of the solid acid and the solid base in the above complex. It is thought that, owing to this neutralization, the complex of the present invention is able to reduce the coloration of the halogen-containing resin at the time of processing and prevent the increase of torque.

A calcium hydroxide crystal of the complex of the present invention is finer than a crystal of calcium hydroxide which is not complexed. Therefore, the complex has a higher BET specific surface area than a calcium hydroxide compound and has an effect of improving a thermostable time of the halogen-containing resin.

Examples of the halogen-containing resin used in the present invention include chlorine-containing synthetic resins such as polyvinyl chloride, polyvinylidene chloride, chlorinated polyethylene, chlorinated polypropylene, chlorinated rubber, a vinyl chloride-vinyl acetate copolymer, a vinyl chloride-ethylene copolymer, a vinyl chloride-propylene copolymer, a vinyl chloride-styrene copolymer, a vinyl chloride-isobutylene copolymer, a vinyl chloride-vinylidene chloride copolymer, a vinyl chloride-styrene-maleic anhydride ternary copolymer, a vinyl chloride-styrene-acrylonitrile copolymer, a vinyl chloride-butadiene copolymer, a vinyl chloride-isoprene copolymer, a vinyl chloride-chlorinated propylene copolymer, a vinyl chloride-vinylidene chloride-vinyl acetate ternary copolymer, a vinyl chloride-acrylic acid ester copolymer, a vinyl chloride-maleic acid ester copolymer, a vinyl chloride-methacrylic acid ester copolymer, a vinyl chloride-acrylonitrile copolymer and copolymers of vinyl chloride and a variety of vinyl ethers. Further, examples of the halogen-containing resin include a blend resin, a block copolymer and a graft copolymer, each of which is obtained from at least two above chlorine-containing synthetic resins or from a synthetic resin containing no chlorine and any one of the above chlorine-containing synthetic resins.

The resin composition of the present invention can further contain a common additive. Examples of the above additive include a phosphate thermal stabilization assistant such as bisphenol A tetra $C_{12-15}$ alkyldiphosphite, tridecyl phosphate, trilauryl phosphite or tris(monophenyl)phosphite; an epoxy stabilizer such as an epoxidized vegetable oil, an epoxidized oleic acid ester or an epoxidized erucic acid ester; a sulfur-containing compound stabilizer such as thiodipropionic acid or a diethyl thiodipropionic acid ester, a phenol stabilizer such as alkyl gallate, phenol typified by alkylated phenol, or styrenated phenol; a stabilizer of an α-amino acid or its functional derivative such as glycine, alanine, leucine, isoleucine, glycinamide, histidine ethyl ester or tryptophan benzyl ester; and an antioxidant such as styrenated para-cresol, 2,6-ditertiarybutyl-4-methylphenol, butylated anisole, 4,4'-methylenebis(6-tertiarybutyl-3-methylphenol), 2,2'-methylenebis(6-tertiarybutyl-4-methylphenol), 1,3,5-trimethyl-2,4,6-tris(3,5-ditertiarybutyl-4-hydroxybenzyl)benzene or tetrakis[3-(4-hydroxy-3,5-ditertiarybutylphenyl)propionyloxymethylene]methane.

The amount of the above additive to be added can be selected as required. For example, the amount of the above stabilizers is about 0.01 to about 5 parts by weight based on 100 parts by weight of the halogen-containing resin and the amount of the antioxidant is about 0.01 to about 2 parts by weight based on 100 parts by weight of the halogen-containing resin.

The resin composition of the present invention can further contain, other than the above additive, another common additive such as a plasticizer, a lubricant, a processing assistant, a weather-resistance improving agent, an antistatic agent, a defogging agent, a reinforcing agent, a filler or a pigment. In the present invention, the halogen-containing resin is mixed and kneaded with the complex of the present invention, etc., and optionally other additive(s) by a common method which can mix them homogeneously. For example, it is possible to adopt a mixing and kneading device, as required, such as a uniaxial or biaxial extruder, a roll or a Banbury mixer. A molding method is not specially limited. For example, it is possible to adopt a molding means, as required, such as injection molding, extrusion molding, blow molding, press molding, rotational molding, calendar molding, sheet forming molding, transfer molding, laminate molding or vacuum molding.

The present invention will be explained with reference to Examples, hereinafter.

Example 1

2 liters of water was placed in a stainless-steel vessel. 10 g of a powder of activated white clay ($SiO2=72.3\%$, $Al_2O_3=13.4\%$, $Fe_2O_3=2.5\%$, $MgO=2.6\%$, $CaO=1.0\%$, BET specific surface area 115 $m^2/g$, PH=5.6)) was added to the vessel with stirring and the resultant mixture was temperature-increased to about 50° C. Then, 2.7 mol of calcium oxide (CaO content 98%) was added to allow the resultant mixture to react at about 80 to 85° C. for about 20 minutes. Then, 200 ml of an aqueous solution having a temperature of about 80° C. in which 6 g of sodium stearate was dissolved was added with stirring, and the mixture was stirred for 5 minutes to carry out surface treatment. Then, filtering and washing with water were carried out. Then, drying was carried out with an oven at about 120° C. for 10 hours. Then pulverization was carried out with an atomizer, to obtain a pulverized material. The pulverized material showed an X-ray diffraction pattern of calcium hydroxide alone. The BET specific surface area of the pulverized material, measured by means of adsorption of liquid nitrogen, was 42 $m^2/g$. The average secondary particle diameter thereof at an accumulation of 50% was 1.2 μm. The above average secondary particle diameter was measured by a laser diffraction method after the pulverized material was subjected to ultrasonic dispersion treatment in an isopropyl alcohol medium for 5 minutes. A sample of the pulverized material was dissolved in hydrochloric acid and then filtered. As a result of chemical analysis of the thus-obtained filtrate, a $Ca(OH)_2$ content was 87.0%. An ether was added to the filtering remnants which were insoluble in acid, an organic substance was extracted with ether and separated. Drying and measurement for a weight were carried out. The measured activated white clay was 1-5%.

Example 2

A pulverized material was obtained in the same manner as in Example 1 except that 0.12 mol of magnesium chloride (about 0.5 mol/liter) was added after 10 minutes from the addition of the calcium oxide. The pulverized material showed an X-ray diffraction pattern of calcium hydroxide alone, although the X-ray diffraction pattern of the pulverized material was slightly shifted to a high angle side. Therefore, it was concluded that Ca is replaced by Mg in $Ca(OH)_2$ to form a solid solution. The BET specific surface area of the material was 45 $m^2/g$. The average secondary particle diameter thereof at an accumulation of 50% was 0.92 μm. The chemical composition of a component dissolved in hydrochloric acid was as follows.

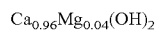

$Ca_{0.96}Mg_{0.04}(OH)_2$

The content of the above solid solution was 92.3%. The content of the activated white clay was 5.2%.

Example 3

A stainless steel vessel was charged with 2 liters of water. The water was heated at about 60° C., then 4 mol of calcium oxide was added, and the mixture was stirred for about 20 minutes, to carry out a hydration reaction. 0.5 liter of a mixed aqueous solution containing 0.6 mol of magnesium chloride and 0.04 mol of zinc chloride was added to the hydration mixture, and the mixture was stirred, to allow the mixture react. After about 5 minutes, 18 g of activated white clay was added with stirring, the mixture was heated at about 90° C. for 20 minutes, and then 100 milliliters of hot water (about 70° C.) containing 6 g of sodium laurate dissolved therein was added with stirring, to carry out surface treatment. Then, filtering, washing with water, drying and pulverization were carried out. The thus-obtained pulverized material showed an X-ray diffraction pattern of calcium hydroxide alone, although the X-ray diffraction pattern of the pulverized material was slightly shifted to a high angle side. Therefore, it is a solid solution of Mg and Zn in $Ca(OH)_2$. The BET specific surface area of the material was 27 $m^2/g$. The average secondary particle diameter thereof at an accumulation of 50% was 1.20 μm. The chemical composition of a component of the material dissolved in hydrochloric acid was as follows.

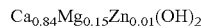

$Ca_{0.84}Mg_{0.15}Zn_{0.01}(OH)_2$

The content of the above solid solution was 92.8%. The content of the activated white clay was 4.9%.

Example 4

One of the complexes of calcium hydroxide compound obtained in Examples 1 to 3 was added as a thermal stabilizer to polyvinyl chloride in accordance with the following recipe. A mixture was obtained in accordance with the recipe and the mixture was melt-kneaded with an open roll at 165° C. for 3 minutes, to obtain a sheet having a thickness of about 1 mm.

| [Recipe] | |
|---|---|
| Polyvinyl chloride (molecular weight 700) | 100 parts by weight |
| Zinc stearate | 0.2 part by weight |
| Stearoyl benzoyl methane | 0.15 part by weight |
| Dipentaerythritol | 1.0 part by weight |
| Thermal stabilizer | 1.0 part by weight |

The sheet having a thickness of about 1 mm was cut to prepare a sheet having a size of about 3 cm×3 cm. The thus-obtained sheet was covered with Teflon (trade name) and then placed in an oven set at 185° C. The sheet was taken out at 10-minute intervals and it was visually observed to evaluate initial coloration (color after 20 minutes) and the time required for blackening (thermal stabilization time). Table 1 shows the results thereof.

Comparative Example 1

Thermal Stabilization Test

A calcium hydroxide was obtained in the same manner as in Example 1 except that the activated white clay was not added. Then, the procedure of Example 4 was repeated in accordance with the same recipe as that in Example 4 except that this calcium hydroxide was used as a thermal stabilizer. Table 1 shows the results of evaluation.

Comparative Example 2

Thermal Stabilization Test

The procedure of Example 4 was repeated in accordance with the same recipe as that in Example 4 except that a commercially-available hydrotalcite [trade name ALCAMIZER] was used as a thermal stabilizer. Table 1 shows the results of evaluation.

Example 5

A mixture was prepared in accordance with the following recipe in which a methyl tin stabilizer [trade name MST-53F] and the complex obtained in Example 2 were used in combination as thermal stabilizers. Thereafter, a thermal stabilization test was carried out by the same procedure as that in Example 4. Table 2 shows the results of evaluation.

[Recipe]

| | |
|---|---|
| Polyvinyl chloride (molecular weight 700) | 100 parts by weight |
| Lubricant (Loxiol G32) | 0.50 part by weight |
| Lubricant (Loxiol G70S) | 0.50 part by weight |
| Methyl tin mercaptide stabilizer (dimethyl thin isooctyl thio glyconate, trade name; TM-181 FSJ) | 0.75 part by weight |
| Thermal stabilizer | 0.25 part by weight |

Comparative Examples 3, 4 and 5

The procedure of Example 5 was repeated except that the same calcium hydroxide as that obtained in Comparative Example 1 was used as a thermal stabilizer (Comparative Example 3), the same hydrotalcite as that used in Comparative Example 2 was used as a thermal stabilizer (Comparative Example 4) or the methyl tin mercaptide stabilizer was used as a thermal stabilizer (Comparative Example 5). Table 2 shows the results of evaluation.

Example 6

A mixture was obtained in accordance with the same recipe as that in Example 4 except that the amount of the thermal stabilizer was changed to 0.5 part by weight. The mixture was measured for a dynamic thermal stability behavior with a Brabender under conditions of a temperature of 190° C., a rotational speed of 40 rpm and a loading amount of 62 g. Table 3 shows the obtained maximum torque value from the results thereof.

TABLE 1

[Results of thermal stabilization test under nonoxidative atmosphere]

| | Thermal stabilizer | Initial coloration | Thermal stability (minute) |
|---|---|---|---|
| Ex. 4-1 | Complex of $Ca(OH)_2$ and activated white clay | White | 130 |
| Ex. 4-2 | Complex of $Ca_{0.96}Mg_{0.04}(OH)_2$ and activated white clay | White | 140 |
| Ex. 4-3 | Complex of $Ca_{0.83}Mg_{0.15}Zn_{0.01}(OH)_2$ and activated white clay | White | 150 |
| CEx. 1 | $Ca(OH)_2$ | Reddish yellow | 100 |
| CEx. 2 | Hydrotalcite | White | 70 |

Ex. = Example,
CEx. = Comparative Example.

TABLE 2

[Results of thermal stabilization test under nonoxidative atmosphere]

| | Thermal stabilizer | Initial coloration | Thermal stability (minute) |
|---|---|---|---|
| Ex. 5 | Complex of $Ca_{0.96}Mg_{0.04}(OH)_2$ and activated white clay | White | 120 |
| CEx. 3 | $Ca(OH)_2$ | Slightly yellow | 100 |
| CEx. 4 | Hydrotalcite | White | 80 |
| CEx. 5 | Methyl tin mercaptide stabilizer | White | 80 |

Ex. = Example,
CEx. = Comparative Example.

TABLE 3

| | Thermal stabilizer | Maximum torque (Nm) |
|---|---|---|
| Ex. 6-1 | Complex of $Ca(OH)_2$ and activated white clay | 24.7 |
| Ex. 6-2 | Complex of $Ca_{0.96}Mg_{0.04}(OH)_2$ and activated white clay | 22.9 |
| Ex. 6-3 | Complex of $Ca_{0.83}Mg_{0.15}Zn_{0.01}(OH)_2$ and activated white clay | 21.0 |
| CEx. 6 | $Ca(OH)_2$ | 28.5 |

Ex. = Example,
CEx. = Comparative Example.

What is claimed is:

1. A stabilized halogen-containing resin composition containing 100 parts by weight of a halogen-containing resin and 0.01 to 10 parts by weight of a complex of at least one member selected from the group consisting of acid white clay and activated white clay with a calcium hydroxide compound represented by the formula (1), $$Ca_{1-x-y}M^{2+}{}_xAl_y(OH)_2 \tag{1}$$

wherein $M^{2+}$ represents at least one bivalent metal selected from the group consisting of Mg, Zn, and Cu, x is in the range of $0 \leq x < 0.4$ and y is in the range of $0 \leq y < 0.1$.

2. The stabilized halogen-containing resin composition according to claim 1, wherein the complex contains the at least one member selected from the group consisting of acid white clay and activated white clay in an amount of 0.1 to 50 parts by weight based on 100 parts by weight of the calcium hydroxide compound of the formula (1).

3. The stabilized halogen-containing resin composition according to claim 1, wherein the complex contains the at least one member selected from the group consisting of acid white clay and activated white clay in an amount of 1 to 10 parts by weight based on 100 parts by weight of the calcium hydroxide compound of the formula (1).

4. The stabilized halogen-containing resin composition according to claim 1, wherein the complex is surface-treated with at least one surface-treatment agent selected from the group consisting of a higher fatty acid, an alkali metal salt of a higher fatty acid, a phosphoric acid ester, a silane coupling agent, an aluminum coupling agent and a titanium coupling agent in an amount of 0.1 to 10% by weight based on the amount of the complex.

5. A process for the production of the complex recited in claim 1, which process comprises mixing calcium oxide or a calcium hydroxide compound represented by the formula (1) in an amount of 100 parts by weight, calculated as a hydroxide, with at least one member selected from the group consisting of acid white clay and activated white clay in an amount of 0.1 to 50 parts by weight in an aqueous medium under heat at 60° C. or higher with stirring.

6. The stabilized halogen-containing resin composition according to claim 1, wherein the calcium hydroxide compound represented by the formula (1) is represented by the formula (2), $$Ca_{1-x}M^{2+}{}_x(OH)_2 \qquad (2)$$

wherein $M^{2+}$ represents at least one bivalent metal selected from the group consisting of Mg, Zn and Cu and x is in the range of $0 \leqq x < 0.2$.

7. A thermal stabilizer for a halogen-containing resin, which stabilizer comprises the complex recited in claim 1 as an active ingredient.

* * * * *